United States Patent Office

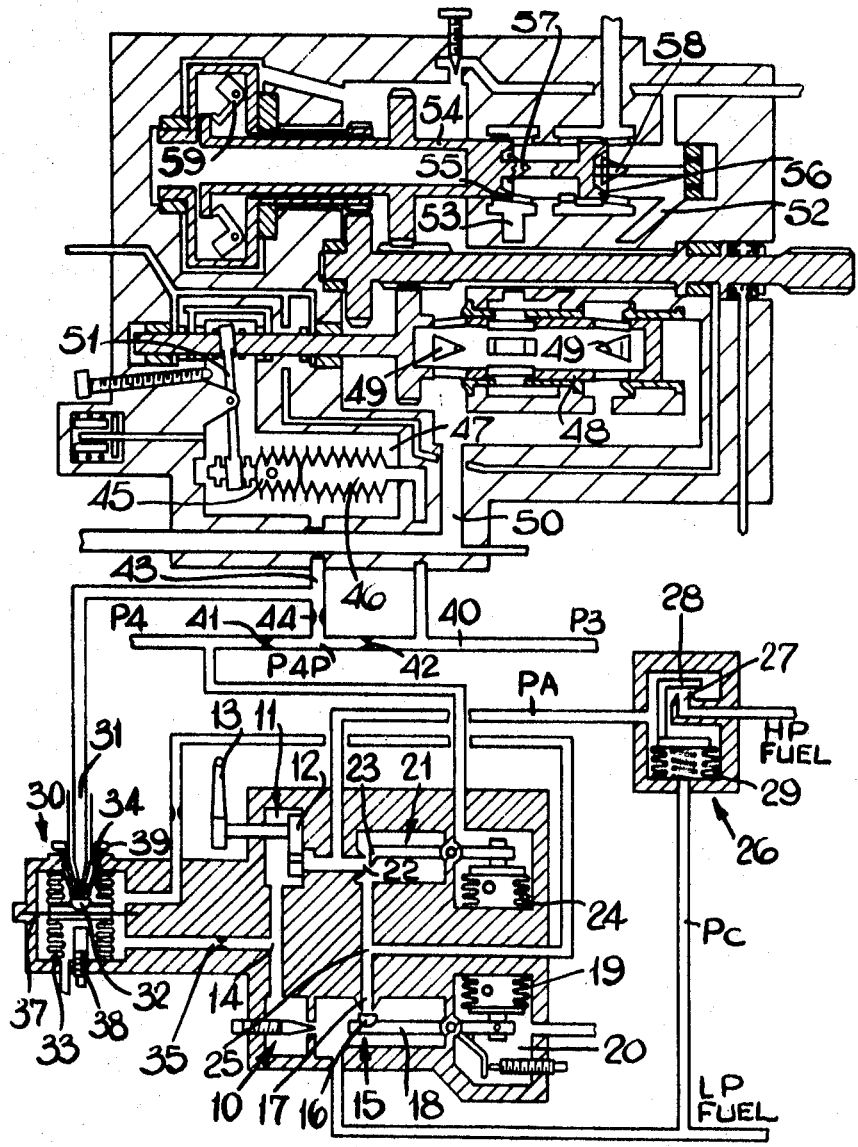

3,613,362
Patented Oct. 19, 1971

3,613,362
GAS TURBINE FUEL CONTROL SYSTEMS
Trevor Stanley Smith, Birmingham, England, assignor to Joseph Lucas (Industries) Limited, Birmingham, England
Filed Sept. 17, 1969, Ser. No. 858,763
Claims priority, application Great Britain, Sept. 20, 1968, 44,804/68
Int. Cl. F02c 9/08
U.S. Cl. 60—39.28 R        18 Claims

ABSTRACT OF THE DISCLOSURE

A fuel control system for a gas turbine engine comprises an hydraulic bridge circuit, a flow restrictor being included in each arm of the bridge and three of the restrictors being variable in accordance with signals obtained from desired and actual engine operating conditions. The input to the bridge is formed by fuel connections having a constant pressure difference and applied at diagonal points of the bridge. Any pressure difference at the bridge output formed by the remaining two points is used to provide a control signal to actuate a control valve through which fuel is supplied to the engine.

---

This invention relates to gas turbine fuel control systems in which it is required to govern the speed of an engine to a desired speed utilising air pressure signals from the compressor of the engine.

A gas turbine fuel control ssytem in accordance with the invention includes an hydraulic bridge circuit comprising a first flow restrictor and a second flow restrictor which is variable to set the desired speed of the engine connected in series between two hydraulic pressure points, one of which is at higher pressure than the other in use, a third flow restrictor variable in accordance with an air pressure signal derived from one part of the compressor and a fourth flow restrictor variable in accordance with an air pressure signal derived from another part of the compressor connected in series between said hydraulic pressure points, whereby two intermediate hydraulic pressures are created in use as a result of hydraulic flow through the restrictors said intermediate pressures existing respectively at the connection between the first and second flow restrictors and at the connection between the third and fourth flow restrictors; and a servo-operated fuel flow control valve arranged so that an increase in one of said intermediate pressures causes closing of the valve to restrict fuel flow and an increase in the other intermediate pressure causes opening of the valve to permit increased fuel flow so as to cause the engine speed to approach its desired value.

The accompanying drawing is a diagram illustrating one example of a gas turbine fuel control system in accordance with the invention.

The system includes an hydraulic bridge circuit constituted by four flow restrictors. The first of these indicated in the accompanying drawing by reference numeral 10 is a fixed restrictor (which may, of course, be adjustable). The second flow restrictor is a variable restrictor 11 controlled by a rotating plate 12 operable by a lever 13. This restrictor 11 is set to determine the desired running speed of the engine. As shown the restrictors 10 and 11 are in series between a controlled supply pressure PA and a lower pressure PC obtained from a boost pump in the ssytem. The difference in the pressures PA and PC is controlled by a constant pressure unit 26. The unit 26 comprises a nozzle 27 to which is applied fuel at high pressure. The nozzle 27 is controlled by a closure member 28 actuated by a spring assisted bellows 29. The bellows 29 is acted upon internally by the pressure PC and externally by the pressure PA. Thus, in use, there is a continuous flow through the restrictors 11, 10 so that a forced intermediate pressure exists at the connection 14 between the two restrictors 10, 11 such pressure varying in accordance with the setting, for the time being, of the restrictor 11.

The third flow restrictor 15 is shown as comprising a half-ball 16 controlling a nozzle 17, although in addition to the half-ball there may be an adze type restrictor in parallel whereby the required characteristic of the restrictor may be otbained.

The half-ball 16 is movable by a lever 18 controlled by an evacuated bellows 19 in a chamber 20 which receives an air pressure signal from the input side of the compressor of the engine to be controlled. The fourth flow restrictor 21 has an adze type control element controlling a nozzle 22. The adze is carried by a lever 23 positioned by an evacuated bellows 24, is subjected to the compressor delivery pressure signal P4. Rising compressor delivery pressure progressively opens the restrictor 21 so as to decrease the pressure drop through the restrictor 21. Rising compressor input pressure similarly opens the restrictor 15 to decrease the pressure drop across this.

The restrictors 15, 21 are again connected in series between the control pressure PA and the boost pressure so that a second intermediate hydraulic pressure exists at the connection 25 between the restrictors 21 and 15.

An exhaust valve 30 comprises a nozzle 31 controlled by a half-ball 32 carried on a diaphragm 37 and movable by a pair of bellows 33, 34, both of which are subjected internally to atmospheric pressure. The pressures at connections 14, 25 are supplied via restrictors 35, 36 respectively to the exterior of bellows 33, 34. Adjustable stops 38, 39 limit the movement of the half-ball 32 in either direction. A passage 40 which includes a pair of restrictors 41, 42 is connected between P4 and a lower pressure P3. The nozzle 30 is connected to a point between the restrictors 41, 42 by a passage 43 which includes a further restrictor 44.

A pair of bellows 45, 46 are arranged in tandem within a chamber 47 and are subjected externally to the pressure in passage 43. Bellows 45 is evacuated and bellows 46 is subjected internally to the pressure P3. A lever 51 actuable by the bellows 45, 46 controls the position of a sleeve 48 which includes a plurality of metering orifices 49.

The orifices 49 control the flow of fuel between an upstream passage 50 and passages 52, 53. The pressure in passage 50 acts upon a rotating spindle 54 in a direction to urge the spindle 54 to the right as seen in the drawing. The spindle 54 includes a pair of closure members 55, 56 which coact with respective orifices 57, 58. A governor mechanism 59 operates to urge the spindle 54 to the left with a force dependent on the engine speed. The pressure in passages 52, 53 is less than that in passage 50. There is thus a net fluid pressure which urges the spindle 54 to the right and which is opposed by the governor 59. The spindle 54 thus adopts a position dependent on the pressure drop through the orifice 49 and on the engine speed. The flow through orifices 57, 58 to the engine is thus dependent on the positions of the orifices 49 and on the engine speed.

Restrictors 41, 42, 44 act in combination with the valve 30 as an air potentiometer, whereby the pressure $KP_4P$ in passage 43 is dependent on the position of the half ball 32, and on the values of $P_3$ and $P_4$. An increase in the pressure at connection 14 will tend to close the nozzle 31 and to raise the pressure $KP_4P$, compressing the bellows 45, 46 and moving the sleeve 48 to permit an increase fuel flow through orifices 49. An increase in the pressure at connection 25 will tend to open the nozzle 31 and thus to decrease fuel flow to the engine.

In use, therefore, when the running speed of the engine is other than that desired the pressure at connection 25 will differ from that established at connection 14 so that the pressures applied to the valve 30 will be unequal and displacement of the sleeve 48 in the appropriate direction will occur. In this way the fuel flow to the engine is adjusted until the engine speed is that desired. The pressures at interconnections 25 and 14 will then be equal and the system will be in equilibrium.

It will be appreciated that in the system described the function of the bridge circuit is to compute what adjustments are required in the position of the sleeve 48 to cause the fuel flow to reach the desired value to cause the engine to run at the desired speed. It has been proposed, heretofore, to make such a computation utilising air signals derived from the compressor of the engine, but previous systems have required various air flow restrictors for the proper computation to be carried out. The computation system shown operates purely on static air pressures and problems which arise in air control systems associated with thermal expansion, blocking of orifices, etc., do not arise. Moreover it is a simple matter to keep the fuel used in the hydraulic system at a sensibly constant temperature. The loop gain provided by the hydraulic system would not vary with altitude.

Having thus described my invention what I claim as new and desire to secure by Letters Patent is:

1. A gas turbine fuel control system including an hydraulic bridge circuit comprising a first flow restrictor and a second flow restrictor which is variable to set the desired speed of the engine connected in series between two hydraulic pressure points, one of which is at higher pressure than the other in use, a third flow restrictor variable in accordance with an air pressure signal derived from one part of the compressor and a fourth flow restrictor variable in accordance with an air pressure signal derived from another part of the compressor connected in series between said hydraulic pressure points, whereby two intermediate hydraulic pressures are created in use as a result of hydraulic flow through the restrictors said intermediate pressures existing respectively at the connection between the first and second flow restrictors and at the connection between the third and fourth flow restrictors; and a servo-operated fuel flow control valve arranged so that an increase in one of said intermediate pressures causes closing of the valve to restrict fuel flow and an increase in the other intermediate pressure causes opening of the valve to permit increased fuel flow so as to cause the engine speed to approach its desired value.

2. A system as claimed in claim 1 which includes a means for maintaining a constant difference in the pressures at the two said points.

3. A system as claimed in claim 2 in which the said means includes a nozzle the flow through which is veriable by a resilient bellows, to the exterior and interior of which the higher and lower of the pressures at the said two points are respectively applied.

4. A system as claimed in claim 1 in which the first flow restrictor is adjustable.

5. A system as claimed in claim 1 in which the second flow restrictor is controlled by a rotating plate.

6. A system as claimed in claim 1 in which the said one part of the compressor is the compressor input.

7. A system as claimed in claim 6 in which the said other part of the compressor is the compressor output.

8. A system as claimed in claim 1 in which the third flow restrictor includes a nozzle, a closure member and a resilient bellows for actuating the closure member, the said bellows being responsive to the signal from the said one part of the compressor.

9. A system as claimed in claim 1 in which the fourth flow restrictor includes a nozzle, a closure member and a resilient bellows for actuating the closure member, the said closure member being responsive to the signal from the said other part of the compressor.

10. A system as claimed in claim 1 which includes an air potentiometer whose output pressure signal is variable in accordance with the difference between the said intermediate hydraulic pressures.

11. A system as claimed in claim 10 in which the said potentiometer has a pair of input signals derived from the compressor.

12. A system as claimed in claim 11 in which one of the input signals is a signal derived from the compressor output.

13. A system as claimed in claim 10 which includes a valve for varying the said output signal.

14. A system as claimed in claim 13 in which the valve means includes a nozzle, a closure member and a pair of bellows for actuating the closure member, each of the said intermediate pressures being applied to a respective one of the said bellows.

15. A system as claimed in claim 10 which includes an actuating means for the fuel control valve and responsive to the said output signal.

16. A system as claimed in claim 15 in which the actuating means is a bellows arrangement.

17. A system as claimed in claim 16 in which the bellows arrangement comprises a pair of bellows in tandem, one of the bellows being evacuated, the lower of the potentiometer input signals is applied to the inside of the other bellows and the said input is applied to the outsides of both the said bellows.

18. A system as claimed in claim 1 in which the fuel flow control valve is in the form of a sleeve having a metering orifice.

References Cited

UNITED STATES PATENTS

| | | | |
|---|---|---|---|
| 3,075,351 | 1/1963 | McCombs | 60—39.28 |
| 3,444,688 | 5/1969 | Warne | 60—39.28 |
| 3,447,315 | 6/1969 | Long | 60—39.28 |
| 3,509,720 | 5/1970 | Warne | 60—39.28 |
| 3,511,047 | 5/1970 | Yates | 60—39.28 |
| 3,514,948 | 6/1970 | Warne | 60—39.28 |

FOREIGN PATENTS

| | | | |
|---|---|---|---|
| 808,419 | 2/1959 | Great Britain | 60—39.28 |
| 884,509 | 12/1961 | Great Britain | 60—39.28 |
| 1,013,135 | 12/1965 | Great Britain | 60—39.28 |

CLARENCE R. GORDON, Primary Examiner